(12) United States Patent
Venrooij

(10) Patent No.: US 8,425,826 B2
(45) Date of Patent: Apr. 23, 2013

(54) METHOD AND DEVICE FOR CONTROLLABLE ENCAPSULATION OF ELECTRONIC COMPONENTS

(75) Inventor: Johannes Lambertus Gerarus Maria Venrooij, Duiven (NL)

(73) Assignee: Fico B.V., Duiven (NL)

( * ) Notice: Subject to any disclaimer, the term of this patent is extended or adjusted under 35 U.S.C. 154(b) by 1335 days.

(21) Appl. No.: 11/629,345

(22) PCT Filed: Jun. 9, 2005

(86) PCT No.: PCT/NL2005/000421
§ 371 (c)(1),
(2), (4) Date: Jan. 25, 2008

(87) PCT Pub. No.: WO2005/120799
PCT Pub. Date: Dec. 22, 2005

(65) Prior Publication Data
US 2008/0277825 A1    Nov. 13, 2008

(30) Foreign Application Priority Data
Jun. 11, 2004    (NL) ........................... 1026407

(51) Int. Cl.
*B29C 45/14* (2006.01)
(52) U.S. Cl.
USPC ............... 264/279.1; 264/13; 425/547
(58) Field of Classification Search ........... 264/279.1; 425/547
See application file for complete search history.

(56) References Cited

U.S. PATENT DOCUMENTS

| | | | |
|---|---|---|---|
| 3,859,024 A | | 1/1975 | Pasch et al. |
| 4,387,762 A | * | 6/1983 | Rinderle ............ 165/104.27 |
| 4,569,814 A | * | 2/1986 | Chong et al. ............ 264/279 |
| 4,577,078 A | | 3/1986 | Noda et al. |
| 4,720,424 A | * | 1/1988 | Eickman et al. ......... 428/323 |
| 4,927,580 A | | 5/1990 | Nasu et al. |
| 6,139,789 A | * | 10/2000 | Neter et al. ............. 264/535 |
| 2004/0041303 A1 | * | 3/2004 | Kim et al. ............... 264/320 |

FOREIGN PATENT DOCUMENTS

| | | |
|---|---|---|
| DE | 8320638.8 U1 | 10/1983 |
| DE | 9305714.8 U1 | 6/1993 |
| EP | 0562556 A1 | 9/1993 |
| JP | 55121044 A2 | 9/1980 |
| JP | 57137130 A2 | 8/1982 |
| JP | 59086229 A2 | 5/1984 |

(Continued)

OTHER PUBLICATIONS

Hoffmann GmbH, Transfer-Molding mit Kaltkanal, p. 92, (1 page), Heidelberg, Germany.

*Primary Examiner* — Jennifer Michener
*Assistant Examiner* — Magali P Slawski
(74) *Attorney, Agent, or Firm* — The Webb Law Firm, PC

(57) ABSTRACT

The invention relates to a method for encapsulating electronic components mounted on a carrier, comprising the processing steps of: A) heating encapsulating material, B) displacing the encapsulating material to a mold cavity, C) filling the mold cavity, and D) curing the encapsulating material in the mold cavity. The temperature regulation of the encapsulating material takes place during separate sections of the path covered by the encapsulating material by creating different temperature zones at least partially separated from each other thermally by means of at least one temperature carrier. The invention also relates to a device for encapsulating electronic components mounted on a carrier.

6 Claims, 3 Drawing Sheets

FOREIGN PATENT DOCUMENTS

| | | | |
|---|---|---|---|
| JP | 61076332 | A2 | 4/1986 |
| JP | 61114824 | A2 | 6/1986 |
| JP | 62039215 | A2 | 2/1987 |
| JP | 63179719 | A * | 7/1988 |
| JP | 63179719 | A2 | 7/1988 |
| JP | 2000052390 | A2 | 2/2000 |

* cited by examiner

METHOD AND DEVICE FOR CONTROLLABLE ENCAPSULATION OF ELECTRONIC COMPONENTS

BACKGROUND OF THE INVENTION

1) Field of the Invention

The invention relates to a method for encapsulating electronic components mounted on a carrier. The invention also relates to a device for encapsulating electronic components mounted on a carrier.

2) Description of the Prior Art

In the encapsulation of electronic components, more particularly the encapsulation of semiconductors mounted on a carrier (such as for instance a lead frame), use is made of the so-called "transfer moulding process". The carrier with electronic components is herein clamped between two mould parts such that mould cavities are defined around the components for encapsulating. Liquid encapsulating material is then introduced into these mould cavities and, after at least partial curing of which the mould parts are moved apart and the carrier with encapsulated electronic components is removed. The feed of encapsulating material takes place by means of one or more plungers with which pressure can be exerted on a supply of encapsulating material provided for this purpose. The plunger is displaceable in a housing into which the not yet liquid encapsulating material is also carried. The encapsulating material is usually placed in the mould in the form of a pellet or in the form of a package enclosed with foil material. The encapsulating material normally consists of a thermocuring epoxy or resin which incorporates a filler. The plunger exerts a pressure on the encapsulating material which is simultaneously heated, as a result of which heating the encapsulating material becomes liquid. As a response to the pressure applied by the plunger, the liquid encapsulating material flows to the heated mould cavity and fills it with encapsulating material. During this displacement of the encapsulating material this material is heated, whereafter it cures thermally (as a result of cross-linking) in the heated mould cavity. This method functions, but the duration of the processing cycle is long and the quality of the encapsulating process is not always readily controllable.

The Japanese patent 62 039215 describes a method for encapsulating products with resin. A mould for use herein is provided with mould cavities, which mould cavities have a lower temperature during the encapsulation than the feed channels and a plunger opening from which the encapsulating material is supplied. Arranged for this purpose in an encapsulating device are different heating elements which can operate independently of each other at different temperature levels.

The Japanese patent 63 179719 describes a method and device for encapsulating products with resin. A mould for use herein is provided with a hot runner section and a a cavity section, in between which heat insulating components are provided. The mould allows to control the temperature of the hot runner and cavity section individually.

The Japanese patent 61 1114824 describes a method and device for moulding products with a resin. To perform melting and curing of the resin effectively, the mould is provided with a pot section from which the resin is provided, and a cavity section, in between which a heat insulating section is provided. The pot section is provided with a separate heater thereby thermally separating it from the cavity section.

The object of the present invention is to provide a method and a device for an improved controllable encapsulation of electronic components and to improve the quality of such an encapsulation.

SUMMARY OF THE INVENTION

The present invention provides for this purpose a method for encapsulating electronic components mounted on a carrier. The temperature can be regulated to both heat and cool the encapsulating material. When a mould cavity is filled with encapsulating material, it is at least partially filled with encapsulating material, but it is usual for the mould cavity to be completely filled with encapsulating material. The method comprises A) heating encapsulating material such that it becomes liquid, B) displacing the encapsulating material to a heated mould cavity enclosing the electronic component by exerting pressure on the liquid encapsulating material, C) filling the mould cavity with encapsulating material, and D) at least partially curing the encapsulating material in the mould cavity, whereby temperature regulation of the encapsulating material takes place during separate sections of the path covered by the encapsulating material during the processing steps A)-C) by creating different temperature zones separated from each other thermally by means of at least one temperature barrier, wherein the at least one temperature barrier comprises a recess at least partially separating said temperature zones. The method steps A) to D) are normally performed in alphabetical order. An important advantage of the method according to the invention is that the regulating options in respect of the temperature conditions to which the encapsulating material is exposed during the different stages of the encapsulating process become better controllable, with the result that the behaviour of the encapsulating material also becomes more readily controllable. The viscosity of the material during critical phases of the encapsulating process, the location at which curing begins and the curing speed can for instance thus become precisely controllable. Precisely because there is now at least one temperature barrier present, it is possible to realize a considerable temperature gradient between different sections. It is possible for the temperature of the encapsulating material to be higher, or conversely lower, during processing step A) than the temperature of the encapsulating material in the mould cavity.

An example will first be given of what the possible advantages can be of initially heating the encapsulating material more strongly and subsequently heating the encapsulating material less strongly (in the mould cavity). This variation in the temperature progression of the encapsulating material during moulding makes it possible to optimize the process conditions for melting the encapsulating material, displacing the encapsulating material to the mould cavity and filling the mould cavity. This effect can be obtained particularly by means of the presence of at least one temperature barrier, whereby a comparatively considerable temperature difference can be created over a limited distance; in the absence of such a temperature barrier only uniform temperature transitions can be obtained due to temperature conduction, these transitions moreover remaining relatively limited. It is thus precisely the presence of at least one temperature barrier which makes it possible to realize the advantages according to the present invention to the fullest extent. A fast melt of the encapsulating material can thus be obtained by already heating the encapsulating material to relatively high temperature during processing step A), and the melted encapsulating material at relatively high temperature can be displaced more rapidly than heretofore. The curing of the encapsulating material will also begin sooner than in the prior art, and the curing will also take place more rapidly. The encapsulating material will also be more easily displaceable from the feed means to the mould cavity since it is also less viscous at a higher temperature than at a lower temperature, at least shortly after this high temperature has been reached. The increased degree of fluidity of the encapsulating material will also still be present during filling of the mould cavity, whereby the risk of damage to the electronic component for encapsulating and the associated connections (for instance wire sweep) is reduced. Once the encapsulating material is present in the mould cavity, the temperature thereof will possibly fall back to a lower level. The heating means of relatively small capacity connecting for this purpose onto the mould cavity (or even the absence of heating means or the presence of cooling means) also provide advantages. The temperature load on the electronic component and the carrier can thus be smaller than if the prior art method were applied. This is all the more interesting now that more and more use is being made of encapsulating materials with less environmental impact ("green compounds") which must generally be processed at a higher temperature than the conventional encapsulating materials and, in the case of conventional encapsulation, can result in thermal damage to the components for encapsulating and/or carrier (parts). An obvious example hereof is the temperature sensitivity of tin solder present in some circumstances in the carrier and/or component. In a possible variant, the encapsulating material exceeds 140° C. during processing step A), more preferably the encapsulating material exceeds 150° C., 160° C., 170° C. or 180° C. during processing step A).

A second example shows what the possible advantages can be of initially heating the encapsulating material less strongly and subsequently heating the encapsulating material to higher temperatures (in the mould cavity). In order to accelerate curing of the encapsulating material (and thus shorten a processing cycle), it is desirable to minimize the residence time of the component enclosed with encapsulating material in a mould cavity. Since curing of encapsulating material normally takes place more rapidly at a higher temperature than at a lower temperature, curing can be optimized by heating the encapsulating material to the maximum possible temperature. The consequence hereof is that an encapsulated electronic component can be removed from an encapsulating device sooner than according to the prior art.

In a preferred variant, the encapsulating material is actively cooled prior to the start of processing step A) in a device for encapsulating electronic components mounted on a carrier. The starting situation of the encapsulating material prior to the beginning of the encapsulating process can thus be standardized, and a very controlled melting of a pellet of encapsulating material can for instance be obtained by urging such a pellet against a heated melting space (also referred to as the cull bar). The risk of contamination of the plunger housing (sleeve) in which a pellet is usually received is also prevented here.

In addition to the controlled creation of different temperature regimes at determined locations during a moulding process, it is also possible to regulate the temperature dynamically. This means that the temperature at a determined location undergoes controlled changes in time. A particular component of an encapsulating device can thus be heated to above a determined (initiation) temperature to cause a (curing) process to begin and, after this temperature has been reached, to cool the component (or allow the temperature thereof to fall passively) so as to limit for instance the chance of loss of quality of the materials for processing and/or the encapsulating device.

The encapsulating material can be heated during processing step A) by conduction, for instance by urging it against a heated surface. With the use of a plunger with which a body of encapsulating material is placed under pressure, it is possible for a pellet to be heated only by urging the body of encapsulating material against a cull bar, although it is also possible for optionally additional heat to be transmitted by the sleeve and/or the plunger. The advantage of urging a pellet against a cull bar such that it melts only on the side remote from the plunger is that this reduces the problem of leakage of encapsulating material between the plunger and the sleeve.

As an alternative to heating through conduction or in combination with the conductive heating of the encapsulating material, this latter can also be heated by radiation during processing step A). Examples hereof are, among others, induction, RF, ultrasonic or other contactless heating types. The local heating capacity can thus be further increased without this resulting in local overheating of the encapsulating material. A further advantage is that a uniform heating-through of the encapsulating material can be obtained with radiation. It will be apparent that the encapsulating material can also be heated in the mould cavity during processing step D) by conduction and/or radiation.

As already stated above, it is not necessary in determined conditions to heat the encapsulating material still further during processing step D). It is possible to allow the mould cavity to act in wholly passive manner in respect of temperature regulation, but it is also possible to envisage the mould cavity being actively cooled.

The invention also provides a device for encapsulating electronic components mounted on a carrier. A feed means may include a plunger with sleeve; a feed path of the plunger to the mould cavity may also form part of the feed means. As described above, a thermal separation of individual parts of an encapsulating device increases the possibilities of far-reaching control of the encapsulating process, with all the advantages this entails. The thermal separation can for instance be obtained by arranging a thermal insulating material between the feed means and the mould cavity and/or by arranging there between a recess separating the feed means and the mould cavity at least partially from each other such that the conduction of heat from the feed means to the mould cavity is at least considerably impeded. Ambient air can be present in the recess or an insulator can be placed therein. The form of the recess can be slot-like, but may also have any other desired form provided it functions to impede heat conduction. The thermal separation can be located between the feed means and the mould cavity and/or in at least one mould part.

The encapsulating device is preferably provided with a plurality of independently controllable temperature-regulating means. Such temperature-regulating means can be situated inter alia at or in the following locations of the encapsulating device: the plunger, the sleeve, the cull bar connecting onto the sleeve, the upper mould part or individual segments of the upper mould part and/or the lower mould part or individual segments of the lower mould part. The control of the temperature-regulating means can be adapted such that the temperature-regulating means can control the temperature in a dynamic manner; that is, the temperature at a specific location in the device is changeable in time. It is noted here that it is possible for the opposite mould parts from which a mould cavity is assembled to have differing temperatures during use. It is thus possible to choose to give a mould part which is separated from the encapsulating material by the carrier a lower temperature than the mould part which comes into contact with the encapsulating material. As further elucidation of separate heating of different segments of the upper mould part and/or the lower mould part, it is for instance possible, subject to the local conditions (whether or not encapsulating material and/or carrier material is present locally), to heat or cool particular segments to a greater or lesser extent in order to thus create, in combination with one or more temperature barriers, different temperature zones in a mould part. The temperature-regulating means will generally be formed in practice by heating means, although they can also be cooling means.

An effective and structurally simple method of heating can be obtained by heating means with an electrical resistance. Such a resistance heating can be embodied as a heating rod embedded in a conductive thermal material or a flat (optionally flexible) heating element (also referred to as a heating map). Optionally in combination with a heating using an electrical resistance, use can also be made of temperature-regulating means in the form of a radiation source and/or other contactless heating techniques.

Possible heating sources have already been listed above. Under specific conditions it is also possible to opt for embodying the mould cavity (optionally on one side) without heating means, or to even provide it with cooling means. For the advantages hereof reference is made to the above description relating to the method according to the present invention. The temperature-regulating means can be controlled by an active control, whereby it also becomes possible to control the temperature-regulating means in time. A dynamic temperature regulation can thus also be obtained locally.

In a preferred embodiment, the feed means for encapsulating material comprise a shield plate, which shield plate lies at a position directed toward the active side of the plunger and which shield plate is provided with independently controllable temperature-regulating means. Such a shield plate is also referred to as a cull plate. A body of encapsulating material that has not yet been made liquid can be made liquid locally by being urged against such a shield plate, provided the plate is sufficiently heated.

BRIEF DESCRIPTION OF THE DRAWINGS

The present invention will be further elucidated on the basis of the non-limitative exemplary embodiments shown in the following figures. Herein.

DETAILED DESCRIPTION OF THE PREFERRED EMBODIMENTS

Figure 1:
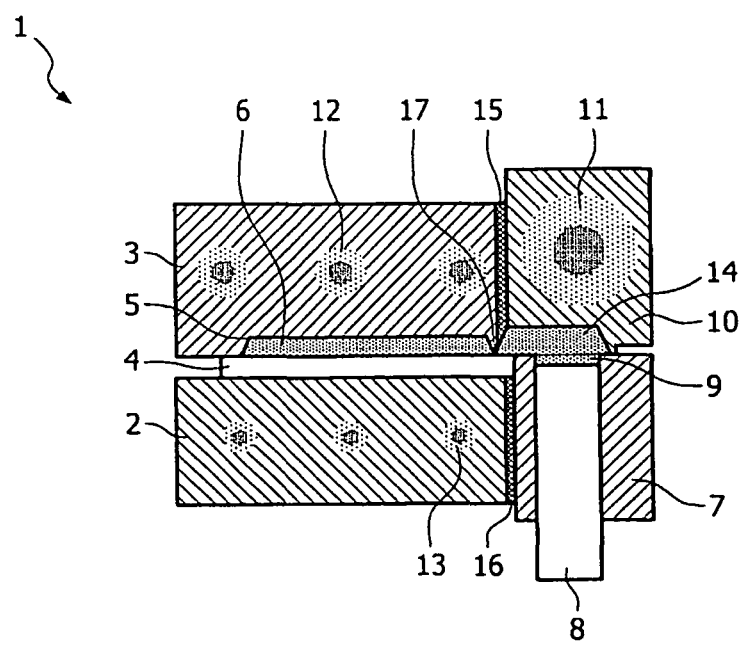
FIG. 1 shows a view of a cross-section through a schematically represented encapsulating device according to the invention.

FIG. 1 shows a schematically represented encapsulating device 1 with a lower mould part 2 and an upper mould part 3 displaceable relative thereto. Clamped between mould parts 2, 3 is a carrier 4 on which is mounted an electronic component which is not visible in this figure. Left clear in upper mould part 3 is a mould cavity 5 in which a housing 6 encasing the electronic component is formed. Lower mould part 2 is also provided with a sleeve 7 in which a plunger 8 is displaceable. Plunger 8 urges a pellet of encapsulating material, only a small remaining part 9 of which is still visible in this figure, against a cull bar 10 which forms part of upper mould part 3. Shown schematically is that the temperature 11 of cull bar 10 is higher than the temperature 12 of upper mould part 3, which is in turn higher than the temperature 13 of lower mould part 2. Sleeve 7 is possibly wholly unheated. By urging a pellet of encapsulating material 9 against the heated cull bar 10 the encapsulating material will melt locally in an intermediate space 14. From this intermediate space 14 the liquid encapsulating material flows through a gate 15 to mould cavity 5. Since the temperature management in encapsulating device 1 requires that cull bar 10 is hotter than mould parts 2, 3, respective thermal insulation elements 15, 16 are arranged between cull bar 10 and upper mould part 3, and also between sleeve 7 and lower mould part 3 in order to limit the heat transmission to mould parts 2, 3.

Figure 2:
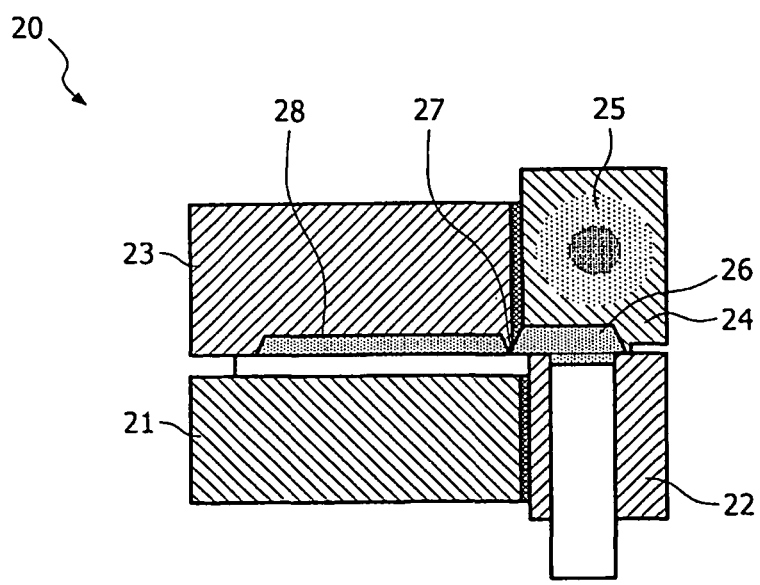
FIG. 2 shows a view of a cross-section through a schematically represented alternative embodiment variant of an encapsulating device according to the invention.

FIG. 2 likewise shows a schematically represented encapsulating device 20 which greatly resembles the encapsulating device shown in FIG. 1. In this encapsulating device 20 no heating is provided in a lower mould part 21 (including a sleeve 22). In an upper mould part 23 a heating 25 is provided only at the position of a cull bar 24. It will be apparent that in this encapsulating device the temperature of the encapsulating material will also decrease according to the present invention as soon as it is displaced out of an intermediate space 26 through a gate 27 to a mould cavity 28.

Figure 3:
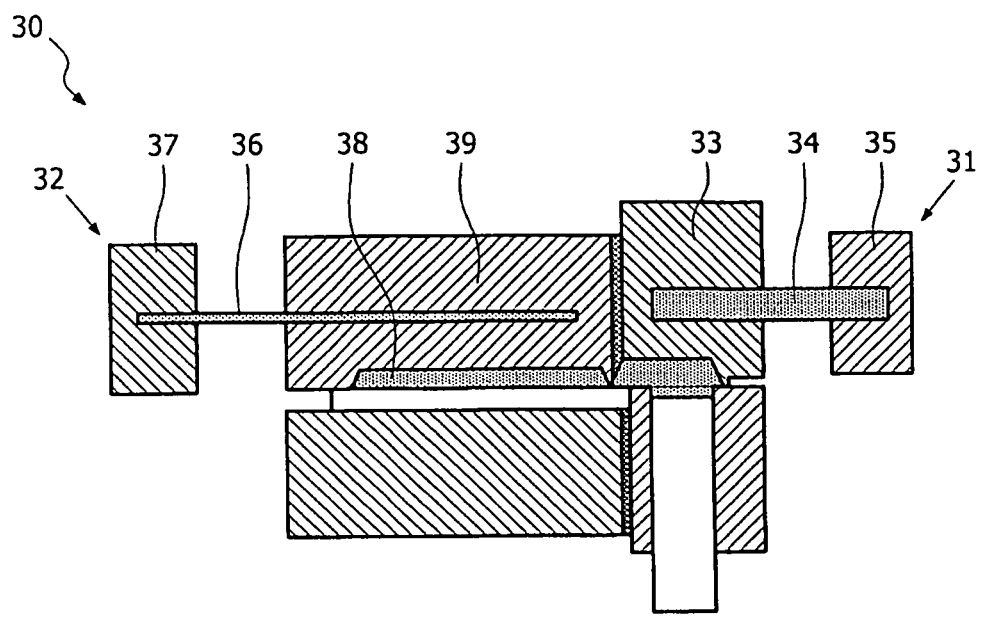
FIG. 3 shows a view of a cross-section through a schematically represented second alternative embodiment variant of an encapsulating device according to the invention.

FIG. 3 once again shows an encapsulating device 30 in which heating elements 31, 32 are now also arranged. Heating element 31 is placed in a cull bar 33 and consists of a transport pipe 34 to which an external heating 35 connects. The heat generated by the external heating 35 is carried by transport pipe 34 into cull bar 32. Similarly to heating element 31, heating element 32 is also provided with a transport pipe 36 and an external heating 37 so that close to a mould cavity 38 the heat generated by external heating 37 can be carried into an upper mould part 39. It is noted that pipes 34, 36 can also be used to cool the associated mould parts.

Figure 4A:
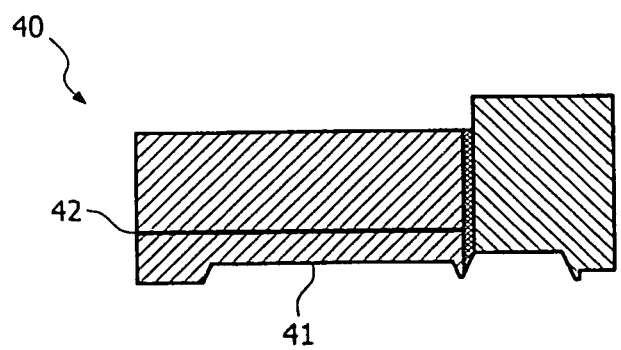
FIG. 4A shows a view of a detail of yet another embodiment variant of an encapsulating device according to the invention.
Figure 4B:
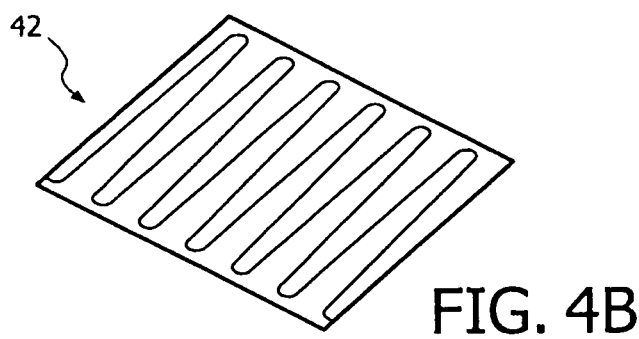
FIG. 4B is a perspective view of a component of the encapsulating device shown in FIG. 4A.

FIG. 4A shows a part 40 of an upper mould part into which a mould cavity 41 is recessed. Received in mould half 40 is a mat 42 (see also FIG. 4B) with which the temperature of mould half 40 can be regulated. Mat 42 can be embodied as heating element, as cooling element or as a combination thereof. A mat 42 can likewise be embodied such that it defines different temperature zones during use.

Figure 5:
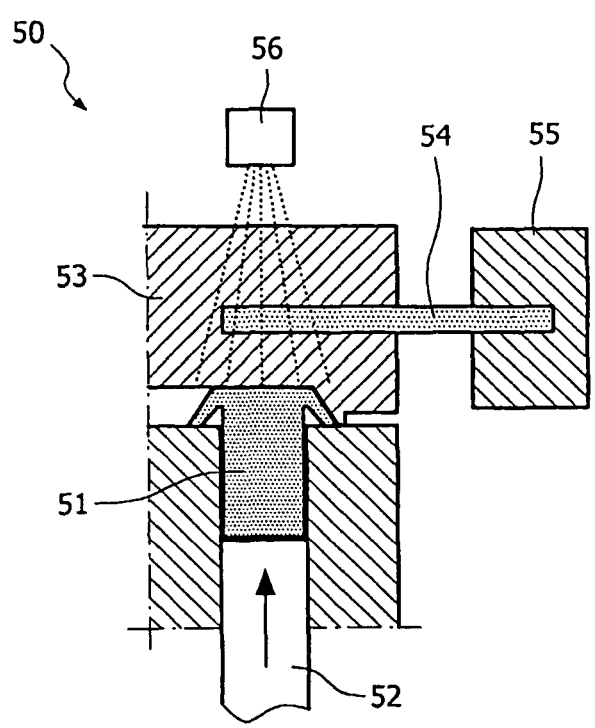
FIG. 5 shows a view of a part of yet another encapsulating device according to the invention during initiation of the encapsulating process.

FIG. 5 shows a part of an encapsulating device 50 during the start of the encapsulating process. A pellet of encapsulating material 51 is urged by a plunger 52 against a cull bar 53 as according to arrow P1. Cull bar 53 is heated by the external heating 55 via a heat transport pipe 54. Also provided is a radiation source 56 with which the encapsulating material 51 is directly heated. Encapsulating material 51 melts as a result of the contact with cull bar 53 and the heat transfer on the top side resulting there from.

The invention claimed is:

1. A method for encapsulating electronic components mounted on a carrier, comprising the processing steps of:
   A) heating encapsulating material inside of a feed means such that the encapsulating material becomes liquid;
   B) displacing the encapsulating material from the feed means to a heated mould cavity enclosing the electronic component mounted on the carrier by exerting pressure on the liquid encapsulating material;

C) filling the mould cavity with encapsulating material; and

D) at least partially curing the encapsulating material in the mould cavity, whereby temperature regulation of the encapsulating material takes place during separate sections of the path covered by the encapsulating material during the processing steps A)-C) by creating different temperature zones separated from each other thermally by means of at least one temperature barrier, wherein the at least one temperature barrier comprises a recess that at least partially separates the feed means in one temperature zone from the mould cavity in another temperature zone, wherein prior to the start of processing step A) the encapsulating material is actively cooled in a device for encapsulating electronic components mounted on a carrier.

2. The method as claimed in claim 1, wherein the temperature of the encapsulating material is higher during processing step A) than the temperature of the encapsulating material in the mould cavity.

3. The method as claimed in claim 1, wherein the temperature of the encapsulating material is lower during processing step A) than the temperature of the encapsulating material in the mould cavity.

4. The method as claimed in claim 1, wherein the temperature of the path covered by the encapsulating material during processing steps A)-C) is regulated dynamically.

5. The method as claimed in claim 1, wherein the encapsulating material is heated by radiation during process step A).

6. The method as claimed in claim 5, wherein the encapsulating material is actively cooled in the mould cavity during processing step D).

\* \* \* \* \*

UNITED STATES PATENT AND TRADEMARK OFFICE
CERTIFICATE OF CORRECTION

PATENT NO.       : 8,425,826 B2  Page 1 of 1
APPLICATION NO. : 11/629345
DATED            : April 23, 2013
INVENTOR(S)      : Johannes Lambertus Gerarus Maria Venrooij It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1743 days.

Signed and Sealed this
Eighth Day of September, 2015

Michelle K. Lee
*Director of the United States Patent and Trademark Office*